United States Patent [19]

Tokuda et al.

[11] Patent Number: 5,414,995
[45] Date of Patent: May 16, 1995

[54] FAILURE DETECTION SYSTEM FOR AIR-FUEL RATIO CONTROL SYSTEM

[75] Inventors: Shoji Tokuda, Nagoya; Takao Matsunaga, Hiroshima; Kazuhiro Shinmoto, Hiroshima; Koichi Terada, Hiroshima; Yoshimi Yamamoto, Higashihiroshima, all of Japan

[73] Assignee: Mazda Motor Corporation, Hiroshima, Japan

[21] Appl. No.: 195,671

[22] Filed: Feb. 16, 1994

Related U.S. Application Data

[63] Continuation of Ser. No. 988,274, Dec. 14, 1992, Pat. No. 5,337,555.

[30] Foreign Application Priority Data

Dec. 13, 1991 [JP] Japan .................................. 3-330421
Dec. 13, 1991 [JP] Japan .................................. 3-330429

[51] Int. Cl.⁶ .............................................. F01N 3/20
[52] U.S. Cl. ...................................... 60/276; 60/277; 123/688; 123/691; 123/697
[58] Field of Search ................... 60/276, 277; 123/688, 123/691, 697

[56] References Cited

U.S. PATENT DOCUMENTS

| | | | |
|---|---|---|---|
| 4,933,863 | 6/1990 | Okano | 123/688 |
| 4,947,818 | 8/1990 | Kamohara | 60/276 |
| 5,077,971 | 1/1992 | Kumagai | 60/276 |
| 5,101,625 | 4/1992 | Sugino | 60/276 |
| 5,134,847 | 8/1992 | Ogawa | 60/277 |
| 5,154,054 | 10/1992 | Nakane | 60/277 |
| 5,157,920 | 10/1992 | Nakaniwa | 60/276 |
| 5,167,120 | 12/1992 | Junginger | 123/688 |
| 5,168,700 | 12/1992 | Furuya | 123/688 |
| 5,220,788 | 6/1993 | Kurita | 60/276 |
| 5,224,345 | 7/1993 | Schnaibel | 60/276 |
| 5,237,818 | 8/1993 | Ishii | 60/276 |
| 5,247,793 | 9/1993 | Yamada | 123/688 |

FOREIGN PATENT DOCUMENTS

61-234241 10/1986 Japan .
0045913  2/1989 Japan ..................................... 60/276

Primary Examiner—Douglas Hart
Attorney, Agent, or Firm—Keck, Mahin & Cate

[57] ABSTRACT

A failure detection system for an air-to-fuel ratio control system includes a exhaust gas monitor positioned upstream of a catalytic converter for monitoring an emission content of exhaust gas based on which an air-to-fuel ratio is feedback controlled so as to be maintained at a desired ratio. The system has another exhaust gas monitor positioned downstream of the catalytic converter for monitoring an emission content of exhaust gas passed through the catalytic converter. Functional failures of the exhaust gas monitor of the air-to-fuel ratio control system is judged to be present on the basis of detected emission contents only when a predetermined threshold amount of intake air is detected.

5 Claims, 10 Drawing Sheets

FAILURE DETECTION SYSTEM FOR AIR-FUEL RATIO CONTROL SYSTEM

This is a continuation of application Ser. No. 07/988,274, filed Dec. 14, 1992, U.S. Pat. No. 5,337,555.

BACKGROUND OF THE INVENTION

1. Field of the Invention

The present invention relates to a failure detection system for detecting failures of an air-fuel ratio control system for feedback controlling an air-fuel ratio of an internal combustion engine.

2. Description of Related Art

In an air-fuel ratio control system, in which an air-fuel ratio is regulated, for-instance, by controlling an injected quantity of fuel, a quantity of fuel to be injected, which is obtained as a basic value of control based on the quantity of intake air introduced into an engine and a rotational speed of the engine, is corrected in accordance with the temperature of engine cooling water, etc. In addition, the basic amount of fuel injected is feedback controlled in accordance with the oxygen ($O_2$) content of exhaust gas as an actual fuel injection amount so as to regulate an air-fuel ratio to a target air-fuel ratio. Since attempts are made in such an air-fuel ratio feedback control system to maintain a stoichiometric air-fuel mixture for providing a theoretically ideal combustible air-to-fuel ratio, the control system allows a three-way catalytic converter to purify exhaust gas effectively.

In order to compensate both for variation in the output properties and for degradation due to time of an air-to-fuel ratio sensor of the air-fuel ratio feedback control system, it has been proposed to dispose another air-to-fuel ratio sensor downstream of the catalytic converter. In such an air-fuel ratio feedback control system, when the upstream air-to-fuel ratio sensor outputs a signal indicating that an air-to-fuel ratio has changed from a rich side to a lean side or vice versa, a set time of delay processing is corrected in accordance with an output from the downstream air-to-fuel ratio sensor. Further, in order for the air-fuel ratio feedback control system, having two air-to-fuel ratio sensors disposed upstream and downstream of a catalytic converter, to minimize a drop in responsiveness due to functional degradation of the upstream air-to-fuel ratio sensor, a skip value (P-value) necessary to perform air-to-fuel ratio control by the use of the upstream air-to-fuel ratio sensor is corrected in feedback control by means of an output from the downstream air-to-fuel ratio sensor. This control is called "P-value feedback control" in the automobile art and is known from, for instance, Japanese Unexamined Patent Publication No. 61-234,241. Since variation in output properties of the downstream air-to-fuel ratio sensor reflects functional degradation of the upstream air-to-fuel ratio sensor, functional failures due to degradation of the upstream air-to-fuel ratio sensor can be detected from an output from the downstream air-to-fuel ratio sensor.

Typically, in the P-value feedback control, while the downstream air-to-fuel ratio sensor outputs a signal indicating that the ratio remains relatively rich, a skip value for changing an air-to-fuel ratio from a rich side toward a lean side is feedback controlled and decremented at a rate of, for instance, 0.2% every specific time period of, for instance, 8.2 milliseconds. Simultaneously, a skip value P for changing an air-to-fuel ratio from a lean side toward a rich side is incremented at the same rate during the same specific time period. Conversely, while the downstream air-to-fuel ratio sensor outputs a signal indicating that the ratio remains on a relatively lean side, a skip value P for changing an air-to-fuel ratio from a rich side toward a lean side is changed by the same increment rate during the same specific time period. Simultaneously, a skip value P for changing an air-to-fuel ratio from a lean side toward a rich side is changed by the same decrement rate during the same specific time period.

Functional degradation of an upstream air-to-fuel ratio sensor, such as an oxygen ($O_2$) sensor, is classified into three forms. These forms include a lean shift degradation, which shifts the center of control of an air-to-fuel ratio toward a lean side; a rich shift degradation, which shifts the center of control of an air-to-fuel ratio toward a rich side, and a frequency degradation, which causes a drop in responsiveness so as to make the frequency of an output signal wave lower. Both the lean shift degradation and the rich shift degradation are detected based on whether a skip value P for air-to-fuel ratio feedback control is above or below a critical level of skip value P or a threshold skip value. On the other hand, the frequency degradation can be known from an increase in ratios of frequencies of output signal waves from the upstream and downstream air-to-fuel ratio sensors.

The P-value feedback control is also utilized to detect functional degradation or a purification efficiency of a catalytic converter between the upstream and downstream air-to-fuel ratio sensors from a ratio of frequencies of output signal waves from the upstream and downstream air-to-fuel ratio sensors. If the functional degradation is above a critical level, the catalytic converter is considered to have failed.

A feedback correction value of a skip value depends upon the time for which an output from a downstream air-to-fuel ratio sensor remains on a rich side or on a lean side, which depends upon the functional performance of a catalytic converter. Consequently, according to functional degradation of the catalytic converter, the remaining time becomes too long to keep a skip value within proper limits or, otherwise, becomes to short to converge to a skip value. If the detection of lean shift degradation and rich shift increase of the upstream air-to-fuel ratio sensor, which is used to perform the air-to-fuel feedback control, is tried by comparing a skip value, corrected by the P-value feedback control, with a threshold skip value, a failure in detection can be caused. This results, on one hand, from overshooting of the skip value due to a very active catalyst and, on the other hand, from a non-converged skip value, due to a great deal of degradation. That is, if the catalytic converter has been less degraded and is at a high exhaust gas purification efficiency, it keeps a high oxygen storage effect. Consequently, an output from the downstream air-to-fuel ratio sensor remains on a rich side or on a lean side for a long time, so as to excessively increase a skip value. This leads to a proper detection of functional degradation of the upstream air-to-fuel ratio sensor. On the other hand, if the catalytic converter has been greatly degraded and is at a low exhaust gas purification efficiency, it suffers a drop in oxygen storage effect. Consequently, an output from the downstream air-to-fuel ratio sensor changes on a short cycle, so as to disable a skip value from converging with the threshold skip value. This also leads to a proper detection of degradation of the upstream air-to-fuel ratio sensor.

In the system for monitoring degradation of the upstream air-to-fuel ratio sensor based on an output from the downstream air-to-fuel ratio sensor, since it is hard for the downstream air-to-fuel ratio sensor to raise the temperature of the catalyst to its active temperature at the beginning of operation, it is generally heated for early activation by a heater. However, heating the air-to-fuel ratio sensor accelerates thermal degradation of the air-to-fuel ratio sensor while an engine operates at high speeds and under high loads. This results in a failure of detection.

When monitoring a ratio of frequencies of output signal waves from the air-to-fuel ratio sensors disposed upstream and downstream of the catalytic converter, respectively, so as to detect a frequency degradation of the upstream air-to-fuel ratio sensor, if the air-to-fuel ratio sensors become so poor in responsiveness that a long time is needed to make a decision as to whether the air-to-fuel ratio is lean or rich, an air-to-fuel ratio may possibly change beyond limits available to the catalytic converter, so that the catalytic converter loses its oxygen storage effect. As a result, the downstream air-to-fuel ratio sensor outputs a signal wave as if the catalytic converter has suffered functional degradation. Consequently, despite the fact that the air-to-fuel ratio sensor operates normally, it is judged to operate incorrectly if the catalytic converter has been degraded.

SUMMARY OF THE INVENTION

It is, therefore, an object of the present invention to provide a failure detection system for an air-fuel ratio control system, including an exhaust gas monitoring means positioned between an engine and a catalytic converter, which can accurately detect functional failures of the exhaust gas monitoring means.

It is another object of the present invention to provide a failure detection system for an air-fuel ratio control system, including an exhaust gas monitoring means positioned between an engine and a catalytic converter, which can accurately detect functional failures of the catalytic converter separately from those of the exhaust gas monitoring means.

The foregoing objects of the present invention are achieved by providing a failure detection system for an air-to-fuel ratio control system, including a primary exhaust gas monitoring means, such as an oxygen ($O_2$) sensor, positioned between an engine and a catalytic converter in an engine exhaust line, for monitoring an emission content of exhaust gas. Based on an emission content detected by the primary exhaust gas monitoring means, the air-to-fuel ratio control system feedback controls an air-to-fuel ratio of air-fuel mixture so as to maintain a desired air-to-fuel ratio. The failure detection system comprises a secondary exhaust gas monitoring means, such as an oxygen ($O_2$) sensor, positioned downstream of the catalytic converter, for monitoring an emission content of exhaust gas passed through the catalytic converter. The failure detection system further comprises a failure judging means, mainly comprising a microcomputer, for judging functional failures; such failures include functional degradation or frequency degradation of the primary exhaust gas monitoring means. The functional failures are determined to be present on the basis of emission contents detected by the primary and secondary exhaust gas monitoring means, and the judgment is made only when a predetermined threshold amount of intake air is detected by an intake-air monitoring means, such as an idle switch built in a throttle valve.

The judgement that the primary exhaust gas monitoring means has failed is made when a ratio of an output frequency of the primary exhaust gas monitoring means to an output frequency of the secondary exhaust gas monitoring means is 1 (one) during off-idling and is greater than a predetermined threshold frequency ratio during on-idling. Further, the failure judging means judges whether the catalytic converter is in frequency failure when the ratio is not 1 (one) during off-idling and when the ratio is smaller than the predetermined threshold frequency ratio during on-idling when the ratio is 1 (one) during off-idling.

The failure judging means may be constructed to judge functional failure, such as may be caused by degradation, of the primary exhaust gas monitoring means on the basis of emission contents detected by the primary and secondary exhaust gas monitoring means. The failure judging means may also be constructed to correct a feedback control parameter for the air-to-fuel ratio control system according to a level of functional degradation of the primary exhaust gas monitoring means, and to judge functional degradation of the catalytic converter on the basis of emission contents detected by the primary and secondary exhaust gas monitoring means only after a judgement of functional failure of the primary exhaust gas monitoring means and correction of the feedback control parameter. In the system thus constructed, failure judgement of the primary exhaust gas monitoring means is made when the feedback control parameter is below a predetermined threshold value, which may be changed according to levels of degradation of the catalytic converter.

BRIEF DESCRIPTION OF THE DRAWINGS

The foregoing and other objects and features of the present invention will be understood more clearly and fully from the following detailed description of the preferred embodiment thereof when considered in conjunction with the accompanying drawings, in which the same reference numbers have been used to denote the same or similar elements throughout the drawings, and in which:

FIGS. 3(a), 3(b), 3(c), 3(d), 3(e) and 3(f) show diagrams of signal waves provided from primary and secondary air-to-fuel ratio sensors;

DETAILED DESCRIPTION OF THE PREFERRED EMBODIMENTS

Because internal combustion engines are well known, the present description will be directed, in particular, to elements forming part of, or cooperating with, the novel structure of a failure detection device for an air-fuel ratio feedback control system in accordance with the present invention. It is to be understood that elements not specifically shown or described can take various forms well known to those skilled in the art.

Figure 1:
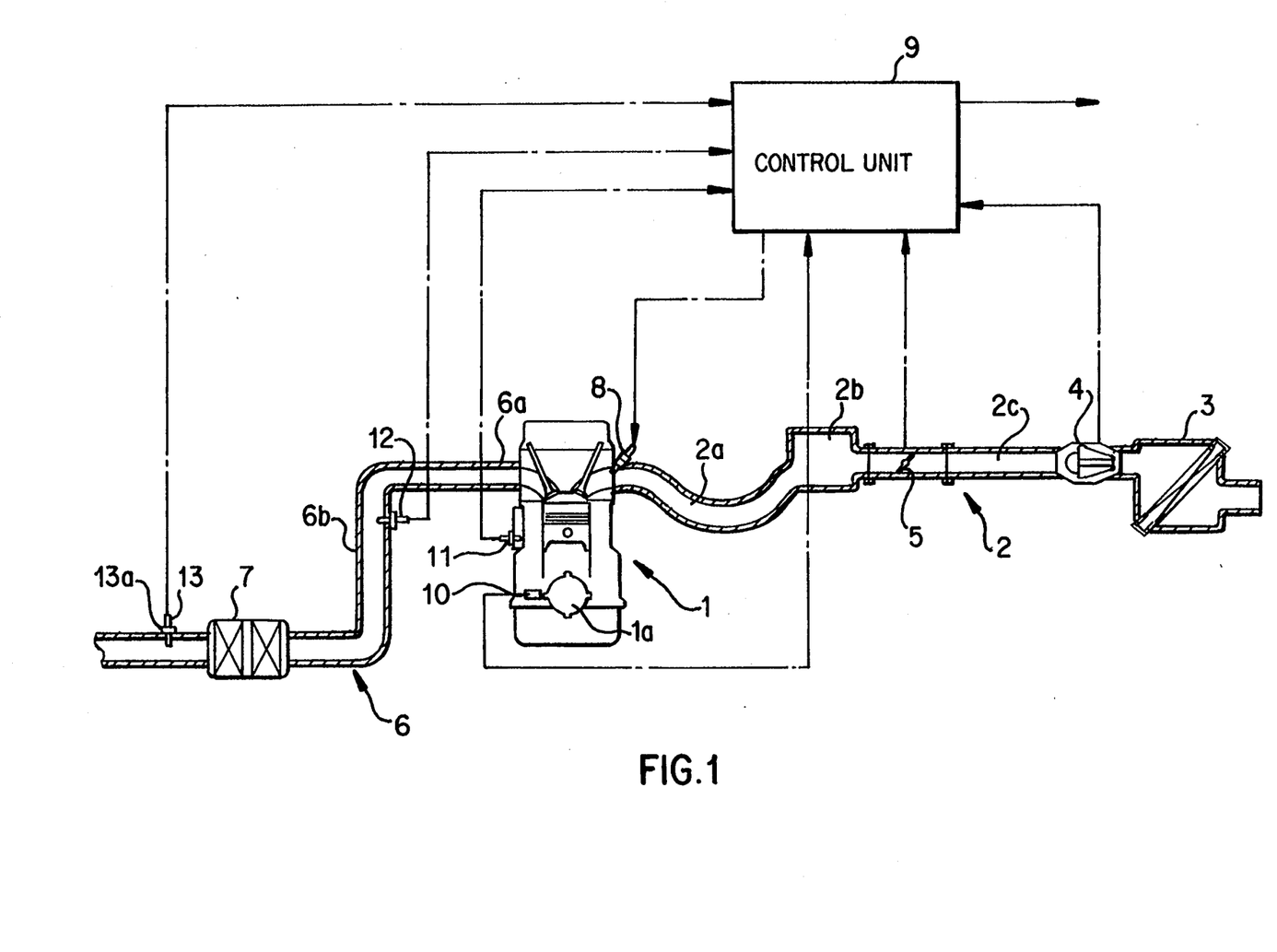
FIG. 1 is a schematic illustration of an engine with an air-to-fuel ratio feedback control system.

Referring to the drawings in detail and, more particularly, to FIG. 1, an engine system provided with a failure detection device for an air-fuel ratio feedback control system in accordance with a preferred embodiment is schematically shown. An engine 1 has an intake system 2 and an exhaust system 6. The intake system 2 includes a plurality of individual intake pipes 2a, independently connected to combustion chambers (not shown) of the engine 1, and a common intake pipe 2c to which the individual intake pipes 2a are connected all together through a surge tank 2b. The common intake pipe 2c is provided with an air cleaner 3, an air flow meter 4, immediately downstream of the air cleaner 3, and an "idle-switch installed" throttle valve 5, i.e., a throttle value provided with an idle switch, disposed upstream of that close to the surge tank 2b. In each of the individual intake pipes 2a, a fuel injector 8 is disposed. The exhaust system 6 includes a plurality of individual exhaust pipes 6a, independently connected to the combustion chambers of the engine 1, and a common exhaust pipe 6b to which the individual exhaust pipes 6a are connected all together. The common exhaust pipe 6b is provided with a catalytic converter 7. Upstream and downstream of the catalytic converter 7, respectively, a primary or upstream air-to-fuel sensor 12 and a secondary or downstream air-to-fuel sensor 13 in the common exhaust pipe 6b are disposed. Each of the air-to-fuel ratio sensors 12 and 13 includes an oxygen ($O_2$) sensor. The engine 1 is provided with an angle sensor 10, cooperating with a crankshaft 1a, to detect an angular velocity of the crankshaft 1a as an engine speed, and a temperature sensor 11 for detecting the temperature of engine coolant. All of these sensors themselves are well known in the automobile art and may be of any well known type. The secondary air-to-fuel ratio sensor 13 has a heater 13a. The heater 13a is activated to turn "on" to heat the secondary air-to-fuel ratio sensor 13 only while failure of the primary air-to-fuel ratio sensor 12 is detected.

The fuel injectors 8 are controlled by a control unit 9 including a microcomputer and deliver a correct quantity of fuel depending upon a pulse width. In order to adjust the pulse width, the control unit 9 receives various electric signals, as fuel injection control parameters, from the air-flow meter 4, the idle-switch installed throttle valve 5, the crankshaft angle sensor 10, the coolant temperature sensor 11, and the primary and secondary air-to-fuel ratio sensors 12 and 13.

Figure 2:
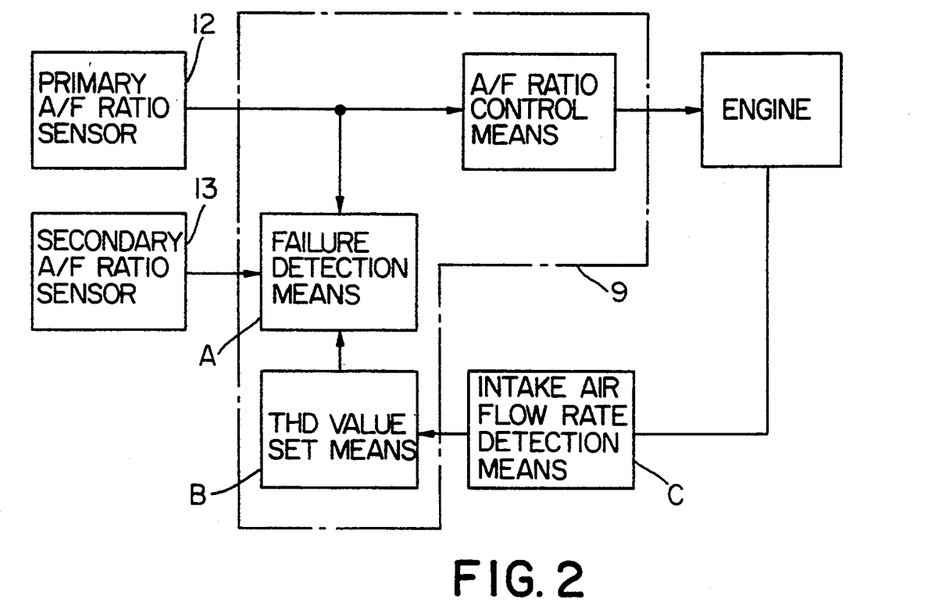
FIG. 2 is a conceptional block diagram showing a failure detection system in accordance with a preferred embodiment of the present invention.

FIG. 2 shows, in block form, the failure detection system for the air-to-fuel ratio feedback control system. As is known in the art, if the primary air-to-fuel sensor 12 becomes poor in responsiveness due to functional degradation, it outputs a signal, representative of an air-to-fuel ratio, which changes greatly. Consequently, the secondary air-to-fuel ratio sensor 13 outputs signals having long waves or long frequencies. Such changes in frequency are particularly significant when the engine operates in off-idling conditions or under loads. However, when the engine operates in, for instance, an on-idling condition, in which only a small quantity of intake air is introduced into the engine and in which an air-to-fuel ratio changes inherently on a long cycle, the output of the secondary air-to-fuel ratio sensor 13 is less affected from degradation in responsiveness of the primary air-to-fuel ratio sensor 12. On the other hand, if the catalytic converter 7, disposed between the primary and secondary air-to-fuel ratio sensors 12 and 13, suffers functional degradation, it loses its oxygen ($O_2$) storage effect regardless of engine operating conditions. For this reason, the tendency of the secondary air-to-fuel ratio sensor 13 to output signals of long waves or long frequencies exists even in an on-idling condition when the catalytic converter 7 has been functionally degraded. Based on this fact, in order to avoid incorrect failure detections of the primary air-to-fuel ratio sensor due to functional degradation in the catalytic converter, a novel failure detection can be executed by the use of the secondary air-to-fuel ratio sensor in an on-idling condition.

For accomplishing the novel failure detection, the control unit 9 performs, in addition to the air-to-fuel ratio control, a failure detection operation when receiving a signal from the idle-switch installed throttle valve 5 indicative of an intake air quantity smaller than a predetermined threshold value of intake air quantity during engine idling. The failure detection of the primary air-to-fuel ratio sensor 12 is made based on a ratio of, for instance, frequencies of signal waves from the primary and secondary air-to-fuel ratio sensors 12 and 13. As noted above, FIG. 2 shows, in block diagram, a conceptualized structure of the failure detection device. The failure detection device includes a failure detection means A which is operable only when a threshold value set means B detects an intake air (A/I) flow rate smaller than the predetermined threshold rate represented by signals from an intake air (A/I) flow rate detection means C, such as the idle-switch installed throttle valve 5.

Figures 3A, 3F:
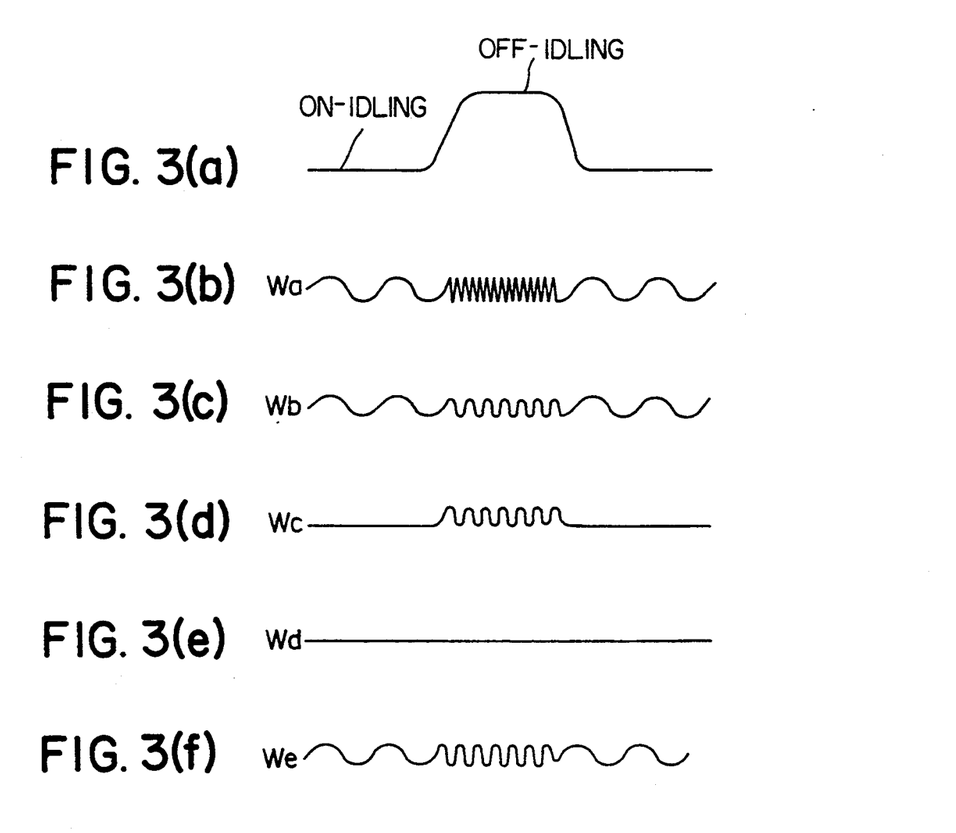

FIG. 3(a) is a time chart representing an engine operation mode. FIG. 3(b) is a time chart representing a signal wave from a normal primary sensor. FIG. 3(c) is a time chart representing a signal wave from a degraded primary sensor. FIG. 3(d) is a time chart representing a signal wave from a secondary sensor when a degraded primary sensor is present. FIG. 3(e) is a time chart representing a signal wave from a secondary sensor when a normal primary sensor is present. Finally, FIG. 3(f) is a time chart representing a signal wave from a secondary sensor when a degraded catalyst is present. As can be understood from time charts shown in FIG. 3(a)-3(f), when the primary air-to-fuel ratio sensor 12 functions normally, it outputs a signal wave PWa in accordance with engine operating conditions, namely, on-idling and off-idling. If the primary air-to-fuel ratio sensor 12 suffers functional degradation, it outputs a signal wave PWb, for off-idling conditions, having a frequency smaller than that of the signal wave PWa when the primary air-to-fuel ratio sensor 12 is functionally normal. On the other hand, when the primary air-to-fuel ratio sensor 12 is functionally degraded, the secondary air-to-fuel ratio sensor 13 outputs a signal wave SWc, for off-idling conditions, having a frequency becoming substantially equal to that of the signal wave PWb when the primary air-to-fuel ratio sensor 12 is degraded, so that a frequency ratio of the signal waves PWb and SWc from the primary and secondary air-to-fuel ratio sensors 12 and 13 reaches 1:1. However, signal waves PWa and PWb from the primary air-to-fuel ratio sensor 12 are almost the same in frequency for on-idling conditions in spite of functional degradation. The secondary air-to-fuel ratio sensor 13 outputs a signal wave SWe having a frequency becoming larger for both off-idling conditions and for on-idling conditions if the catalytic converter 7 is functionally degraded. As long as the primary air-to-fuel ratio sensor 12 is functionally normal, the secondary air-to-fuel ratio sensor 13 outputs a signal wave SWd which does not change in frequency. Consequently, executing a failure detection in only on-idling conditions avoids confusion of a failure of the primary air-to-fuel ratio sensor 12 with a failure of the catalytic converter 7.

The control unit 9 performs a calculation of a basic value of the quantity of fuel To (which is hereafter referred to as a basic fuel injection value). Practically, the basic value is calculated from the following equation:

$$To = K \times Qa/Ne$$

where K is a coefficient, Qa is the quantity of intake air detected by the air-flow meter 4, and Ne is the engine speed detected by the crankshaft angle sensor 10.

After correcting the basic fuel injection value Ta in accordance with a coolant temperature detected by the coolant temperature sensor 11, an actual value of fuel injection quantity T (which is hereafter referred to as an actual fuel injection value), with which fuel is actually injected through the injector 8, is established by adding a feedback control value CFB to the corrected value of the basic fuel injection value Ta. The feedback control value CFB is obtained according to a difference between the air-to-fuel ratio detected by the primary or upstream air-to-fuel ratio sensor 12. Then, the control unit 9 adjusts pulse width so as to deliver a theoretically ideal combustible air-to-fuel ratio of, for example, 14.7 for any given engine demand.

Figure 4:
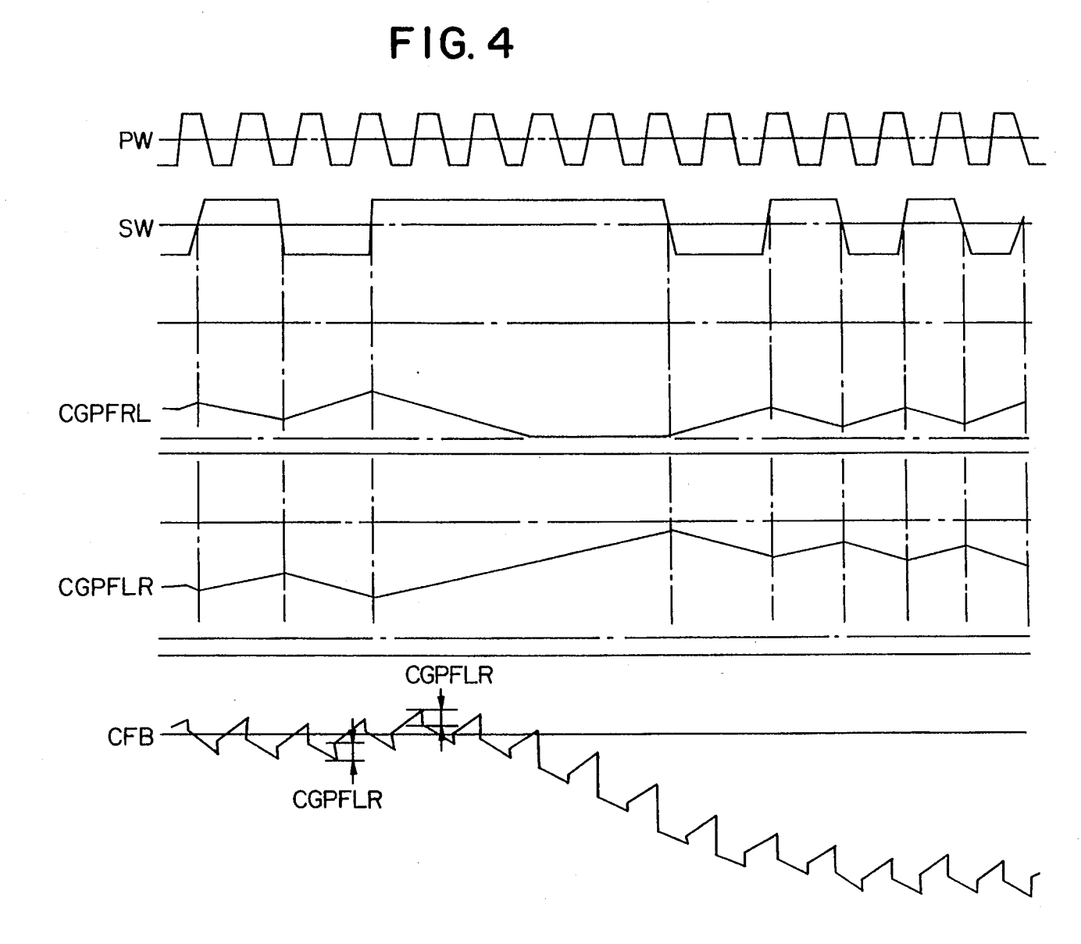
FIG. 4 is a time chart of a skip value feedback control.

In FIG. 4, PW is a signal wave from a primary sensor, SW is a signal wave from a secondary sensor, CGPFRL is a rich side skip value, CGPFLR is a lean side skip value and CFB is a feedback correction value. Referring to FIG. 4, the feedback control value CFB is corrected by a feedback control of a skip value P, for the feedback control value CFB, which changes depending upon an air-to-fuel ratio detected by the secondary air-to-fuel ratio sensor 13. If the skip value feedback control is not conducted, a signal wave SW from the secondary air-to-fuel ratio sensor 13 remains either on a rich side or on a lean side. On the other hand, when conducting the skip value feedback control, an air-to-fuel ratio tends to change greatly beyond a range of the catalytic converter 7 for effective exhaust gas purification, so that a signal wave SW from the secondary air-to-fuel ratio sensor 13 changes. Specifically, a signal wave SW from the secondary air-to-fuel ratio sensor 13 has a low frequency if the primary air-to-fuel ratio sensor 12 is functionally normal, and has a high frequency if the primary air-to-fuel ratio sensor 12 is functionally degraded. The skip value P is defined by CGPFRL for an air-to-fuel ratio changed from a rich side to a lean side (which is hereafter referred to as a lean side skip value) and CGPFLR for an air-to-fuel ratio changed from a lean side to a rich side (which is hereafter referred to as a rich side skip value). The skip value feedback control is performed so as to correct a skip value P for a feedback control value (CFB) according to degradation of the primary air-to-fuel ratio sensor 12. That is, while the secondary air-to-fuel ratio sensor 13 outputs a signal remaining on a rich side, the lean side skip value CGPFRL is changed by a predetermined decremental correction value, for instance 0.2% of the skip value, every specific time period of, for instance, 8.2 milliseconds so as to increase the rich side skip value CGPFLR. Conversely, while the secondary air-to-fuel ratio sensor 13 outputs a signal remaining on a lean side, the lean side skip value CGPFRL is changed by a predetermined incremental correction value, for instance 0.2% of the skip value, every specific time period of, for instance, 8.2 milliseconds so as to decrease the rich side skip value CGPFLR. As a result of changing the skip value as described above, a center value or mean value of the rich side skip value CGPFLR and the lean side skip value CGPFRL converges in accordance with degradation of the primary air-to-fuel ratio sensor 12, so that any influence of degradation is canceled.

The control unit 9 monitors a change in frequency of a signal wave PW from the primary air-to-fuel ratio sensor 12 to detect a predetermined critical degradation of the primary air-to-fuel ratio sensor 12. As was previously described, if the primary air-to-fuel ratio sensor 12 is functionally degraded, it outputs a signal wave PW at a low frequency during off-idling conditions. On the other hand, the secondary air-to-fuel ratio sensor 13 outputs a signal wave SW at a frequency which becomes high during off-idling, so that a frequency ratio of the signal waves PW and SW gradually reaches 1:1. The frequency of an output from the secondary air-to-fuel ratio sensor 13 also becomes high when the catalytic converter has been degraded. The frequency of an output from the secondary air-to-fuel ratio sensor 13 is less adversely affected by degradation of the primary air-to-fuel ratio sensor 12 during on-idling. Based on these facts, in the failure detection device for the air-to-fuel ratio feedback control system, outputs from the primary and secondary air-to-fuel ratio sensors 12 and 13 are monitored to detect a ratio of frequency of the outputs of 1:1 during off-idling. When the off-idling frequency ratio is almost 1:1, outputs from the primary and secondary air-to-fuel ratio sensors 12 and 13 are monitored to detect if a frequency ratio of the outputs rises above a predetermined threshold frequency ratio K during on-idling. If an on-idling frequency ratio beyond the threshold frequency ratio K is detected, it is determined that the primary air-to-fuel ratio sensor 12 has degraded. It is to be understood that the conditions of on-idling and off-idling are detected according to a signal provided from the idle-switch installed throttle valve 5.

The threshold value set means B may be construed so as to set a variable threshold value TV of intake air amount and a correction value d-SKIP by which a skip value is changed every specific time period. Both of these values are variably set according to functional degradation of the catalytic converter 7.

Figure 5:
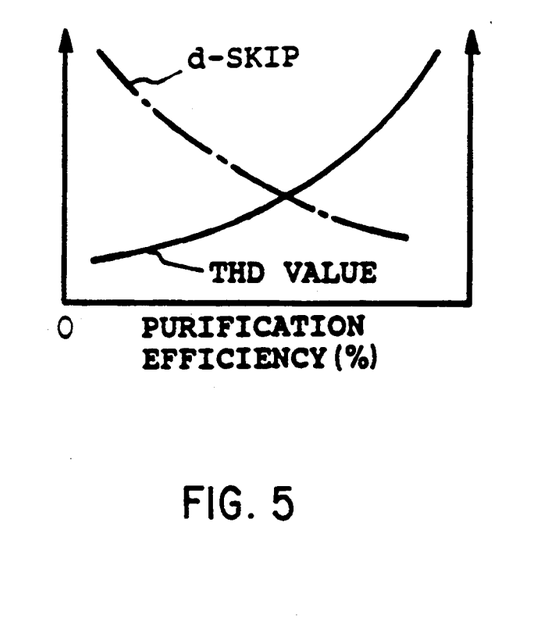
FIG. 5 is a diagram showing characteristics of the air-to-fuel ratio sensor.

FIG. 5 shows the generalized correlation between skip value and threshold (TMD) value with respect to degradation, or exhaust gas purifying efficiency, of the catalytic converter. A correction value d-SKP of the skip value is larger for a low exhaust gas purifying efficiency than for a high exhaust gas purifying efficiency. The higher a gas purifying efficiency becomes, the smaller it becomes likely in a second-order curve. On the other hand, a threshold value TV of the intake air amount is smaller for a low exhaust gas purifying efficiency than for a high exhaust gas purifying efficiency. The higher a gas purifying efficiency becomes, the larger it becomes likely in a second-order curve. Consequently, while the catalytic converter 17 is still highly active or fresh, the correction value d-SKP of the skip value remains large and the threshold value TV of the intake air amount remains small, so that a skip value P is prevented from overshooting. On the other hand, if the catalytic converter 17 is progressively degraded to make its gas purifying efficiency low, a skip value P is large, and a threshold value TV of the intake air amount is small, so that an average skip value rapidly converges. As a result, the detection of degradation is reliably monitored.

Figure 6:
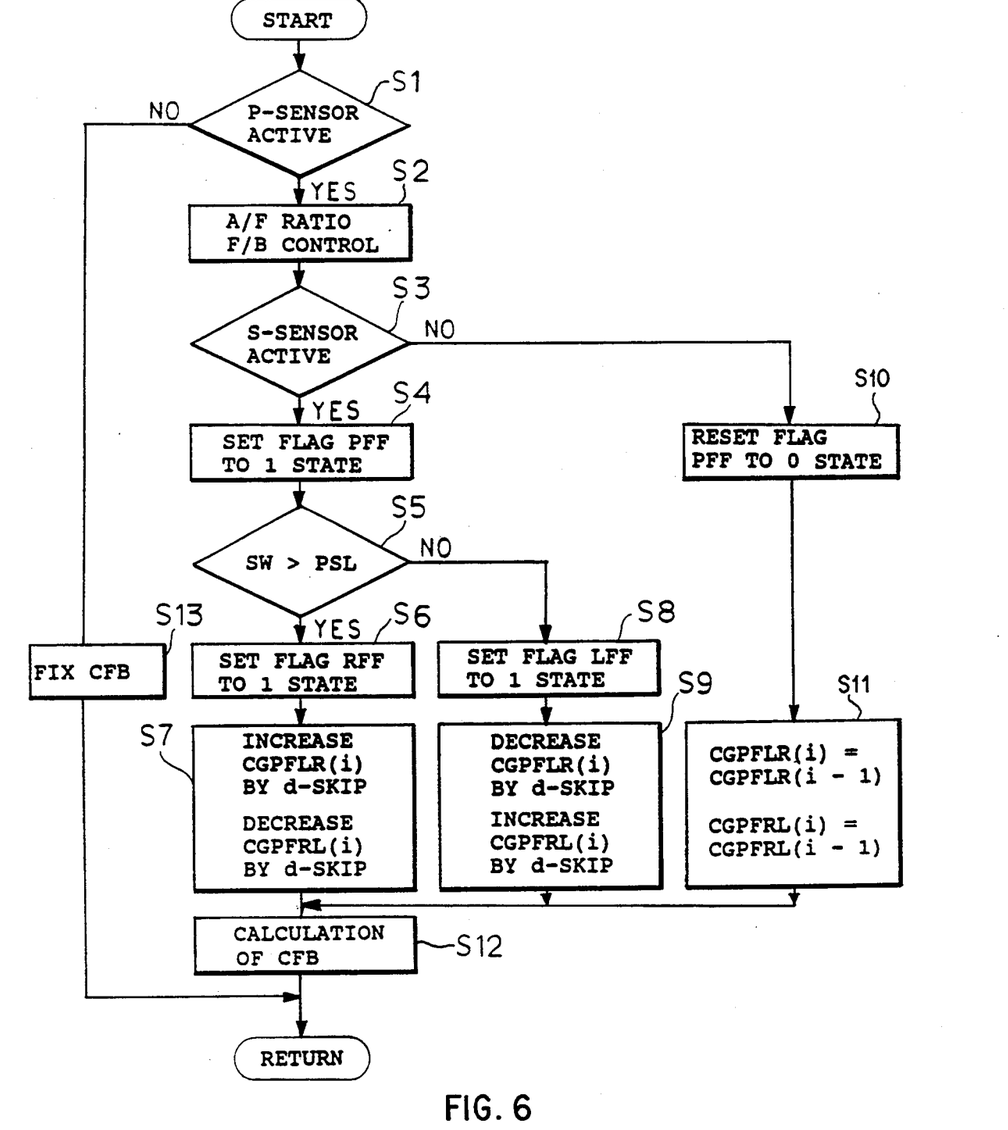
FIG. 6 is a flow chart illustrating a skip value feedback control sequential routine.

FIG. 6 is a flow chart illustrating the P-value feedback control sequential routine. When the P-value feedback control starts, a decision is made at step S1 as to whether or not the primary air-to-fuel ratio sensor 12 is active. If the answer to this decision is "YES," an air-to-fuel (A/F) ratio feedback (F/B) control is carried out at step S2. Then, a decision is made at step S3 as to whether or not the secondary air-to-fuel ratio sensor 13 is active. When the answer to the decision made at step S3 is "YES," this indicates that both the primary and secondary air-to-fuel ratio sensors 12 and 13 are active. Then, at step S4, a P-value feedback control flag PFF for the secondary air-to-fuel ratio sensor 13 is set to "1", indicating that the P-value feedback control is allowed. Thereafter, a decision is made at step S5 as to whether or not an output SW from the secondary air-to-fuel ratio sensor 13 is above a preset slice level PSL. If an above-the-slice level output is detected, after setting a rich fuel flag RFF for the secondary air-to-fuel ratio sensor 13 to "1", which indicates that an air-to-fuel ratio is on a rich side, at step S6, the rich side skip value CGPFLR is incremented by a correction value d-SKIP and, at step S7, the lean side skip value CGPFRL is decremented by the correction value d-SKIP.

If the answer to the decision made at step S5 is "NO," this indicates that the output SW from the secondary air-to-fuel ratio sensor 13 is below the preset slice level PSL. Then, a lean fuel flag LFF for the secondary air-to-fuel ratio sensor 13 is set to "1", which indicates that an air-to-fuel ratio is on a lean side, at step S8. Thereafter, at step S9, the rich side skip value CGPFLR is decremented by the correction value d-SKIP, and the lean side skip value CGPFRL is incremented by the correction value d-SKIP.

When the answer to the decision made at step S3 is "NO," although the primary air-to-fuel ratio sensor 12 is active, the secondary air-to-fuel ratio sensor 13 is inactive. Then, at step S10, the P-value feedback control flag PFF is reset to "1", indicating that the P-value feedback control is prohibited. Thereafter, the rich side skip value CGPFLR and the lean side skip value CGPFRL are replaced with previous skip values CGPFLR(i−1) and the lean side skip value CGPFRL(i−1), respectively, at step S11. After having set the rich side skip value CGPFLR and the lean side skip value CGPFRL at either one of steps at step S7, S9 and S11, a calculation is performed for a feedback control value (CFB) at step S12. If the answer to the decision made at step S1 is "NO," this indicates that the primary A-S sensor 12 is inactive. A previous feedback control value (CFB) is then fixed at step S13.

Figure 7:
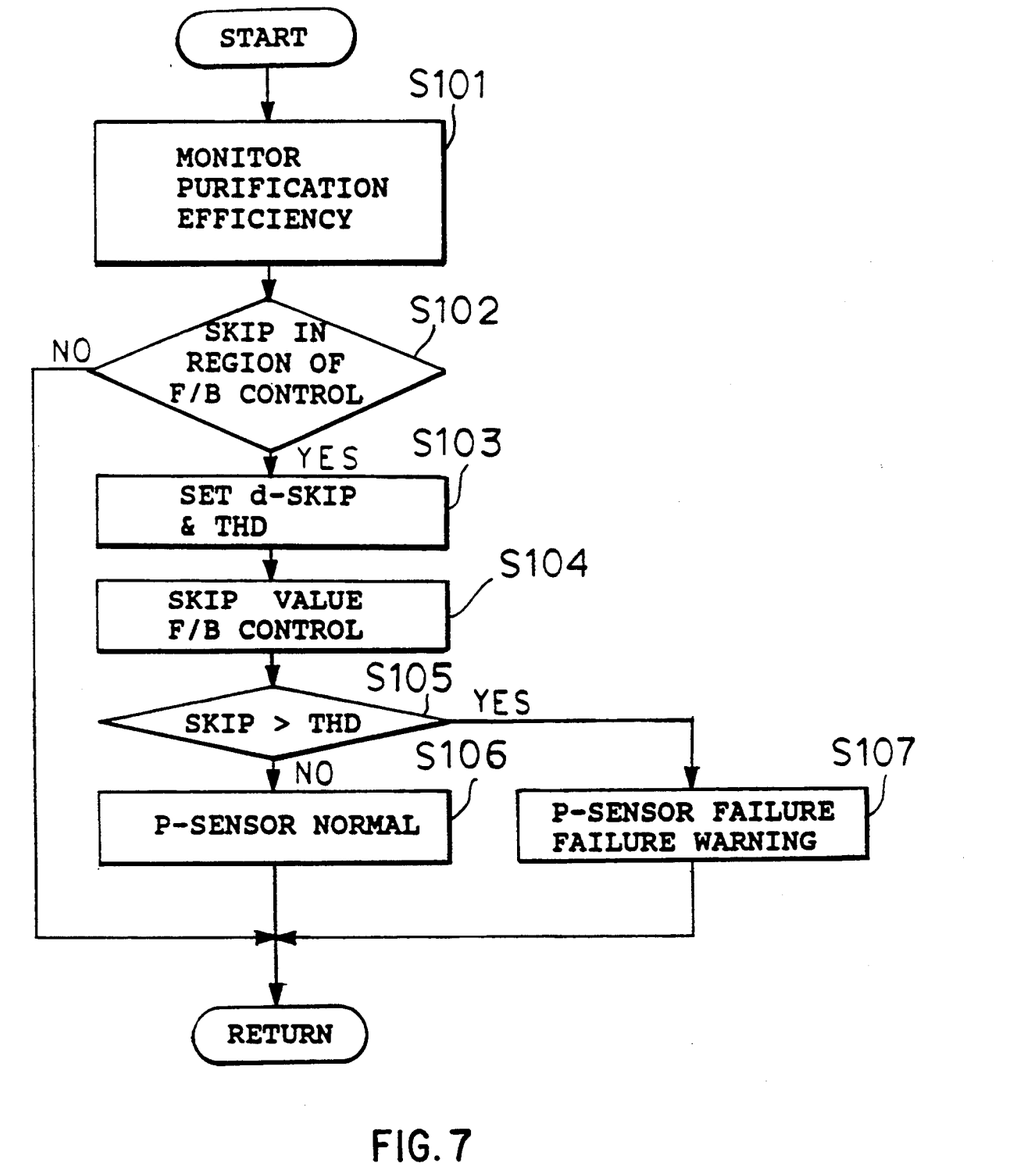
FIG. 7 is a flow chart illustrating a failure detection control sequential routine of the failure detection system shown FIG. 2.

FIG. 7 is a flow chart illustrating the sequence routine of degradation detection of the primary air-to-fuel ratio sensor. Immediately after monitoring the purifying efficiency of the catalytic converter 7 at step S101, a decision is made at step S102 as to whether or not an air-to-fuel ratio is within a region of P-value feedback control. If the answer to the decision made at step S102 is "NO," this indicates that the air-to-fuel ratio is out of the P-value feedback control region. Then, the control sequence orders return. On the other hand, if the answer to the decision made at step S102 is "YES," this indicates that the air-to-fuel ratio is within the P-value feedback control region. Then, at step S103, a correction value d-SKIP for the skip value and a threshold value TV are read and set from a map shown in FIG. 5 according to the purifying efficiency of the catalytic converter 7 monitored at step S101. Based on the correction value d-SKIP, the P-value feedback control is carried out at step S104.

At step S105, a decision is made as to whether or not an average corrected skip value SKIP is beyond the threshold value TV. If the average corrected skip value SKIP is below the threshold value TV, i.e., the answer to the decision made at step S105 is "NO," the primary air-to-fuel ratio sensor 12 is judged to be normally active at step S106. However, if the average corrected skip value SKIP is beyond the threshold (THD) value, i.e., the answer to the decision made at step S105 is "YES," the primary air-to-fuel ratio sensor 12 is judged to have failed in function and a lamp is turned on to warn a failure of the primary air-to-fuel ratio sensor 12 at step S107.

It is to be understood that in place of changing both a skip correction value d-SKIP and a threshold (THD) value, either one of them may be changed in accordance with a monitored purifying efficiency of the catalytic converter 7a.

Figure 8:
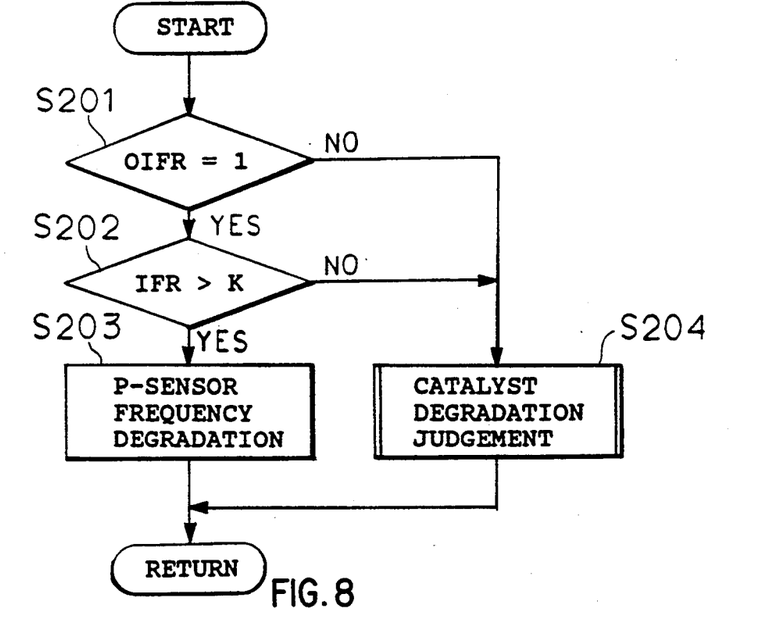
FIG. 8 is a flow chart illustrating a frequency failure detection control sequential routine.

Referring to FIG. 8, which is a flow chart illustrating a frequency degradation detection sequential routine, the first step S201 is to conduct a decision as to whether or not an off-idling frequency ratio (OIFR) between the primary and secondary air-to-fuel ratio sensors 12 and 13 is 1 (one). If the answer to the decision made at step S201 is "YES," then another decision is made at step S202 as to whether or not an on-idling frequency ratio (IFR) between the primary and secondary air-to-fuel ratio sensor 12 and 13 is above a predetermined threshold ratio K. If the answer to the decision made at step S202 is "YES," the primary air-to-fuel ratio sensor 12 is judged to have caused frequency degradation at step S203. If the off-idling frequency ratio (OIFR) between the primary and secondary air-to-fuel ratio sensor 12 and 13 is not 1 (one), and, although the off-idling frequency ratio (OIFR) between the primary and secondary air-to-fuel ratio sensor 12 and 13 is 1 (one), if the on-idling frequency ratio (IFR) between the primary and secondary air-to-fuel ratio sensor 12 and 13 is below the predetermined threshold ratio K, then, the catalytic converter 7 is judged to be functionally degraded at step S204.

Figure 9:
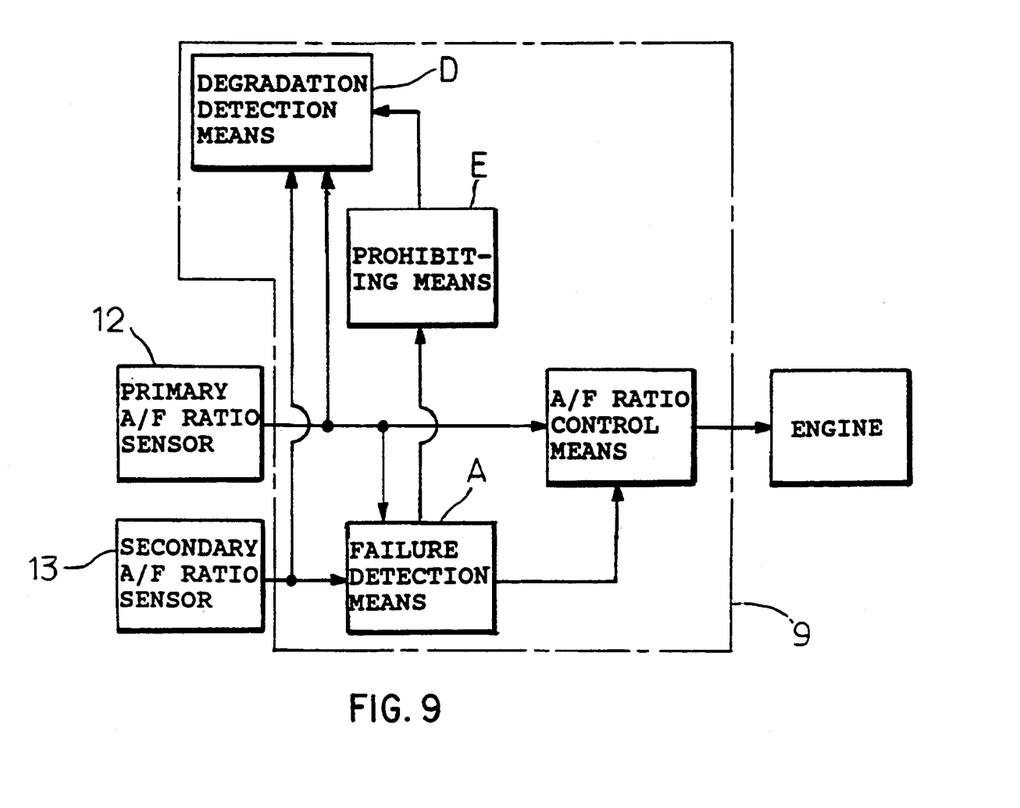
FIG. 9 is a conceptional block diagram showing the failure detection system in accordance with another preferred embodiment of the present invention.

FIG. 9 shows diagrammatically the failure detection device for the air-to-fuel ratio feedback control system in accordance with another preferred embodiment of the present invention. In this failure detection device, the detection of degradation of the catalytic converter is carried out after a center value of skip values has converged as a result of absorption of lean shift degradation and rich shift degradation of the air-to-fuel ratio sensor. For accomplishing the failure detection, a control unit 9 includes a degradation detection means D for detecting functional degradation of a catalytic converter based on outputs from primary and secondary air-to-fuel ratio sensors 12 and 13 and a prohibiting means E for prohibiting operation of or disabling the catalyst deterioration detection means D until a failure detection means A completes failure detection and skip value correction.

Figure 10A:
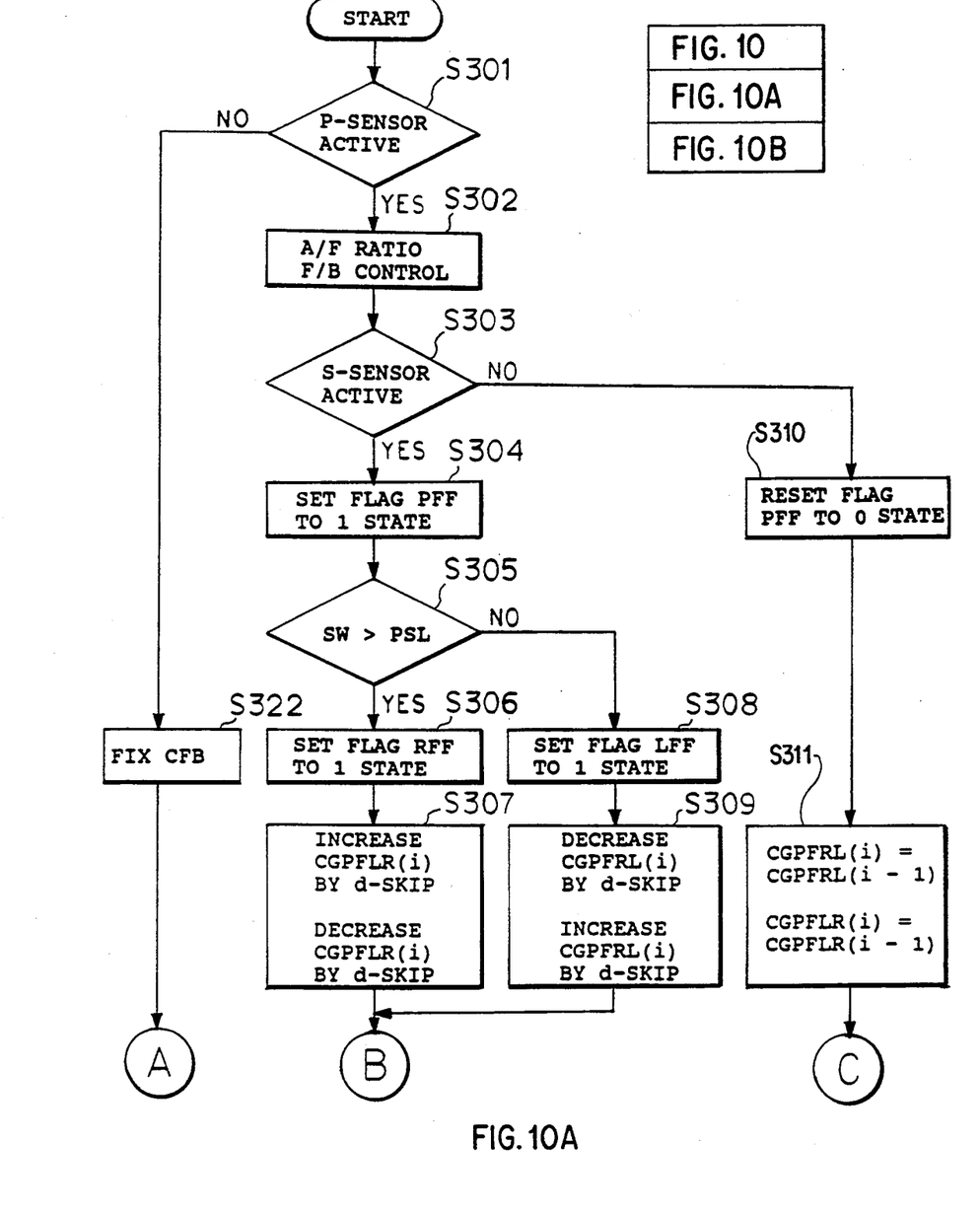
FIG. 10 is a flow chart illustrating a failure detection control sequential routine of the failure detection system shown FIG. 9.
Figure 10B:
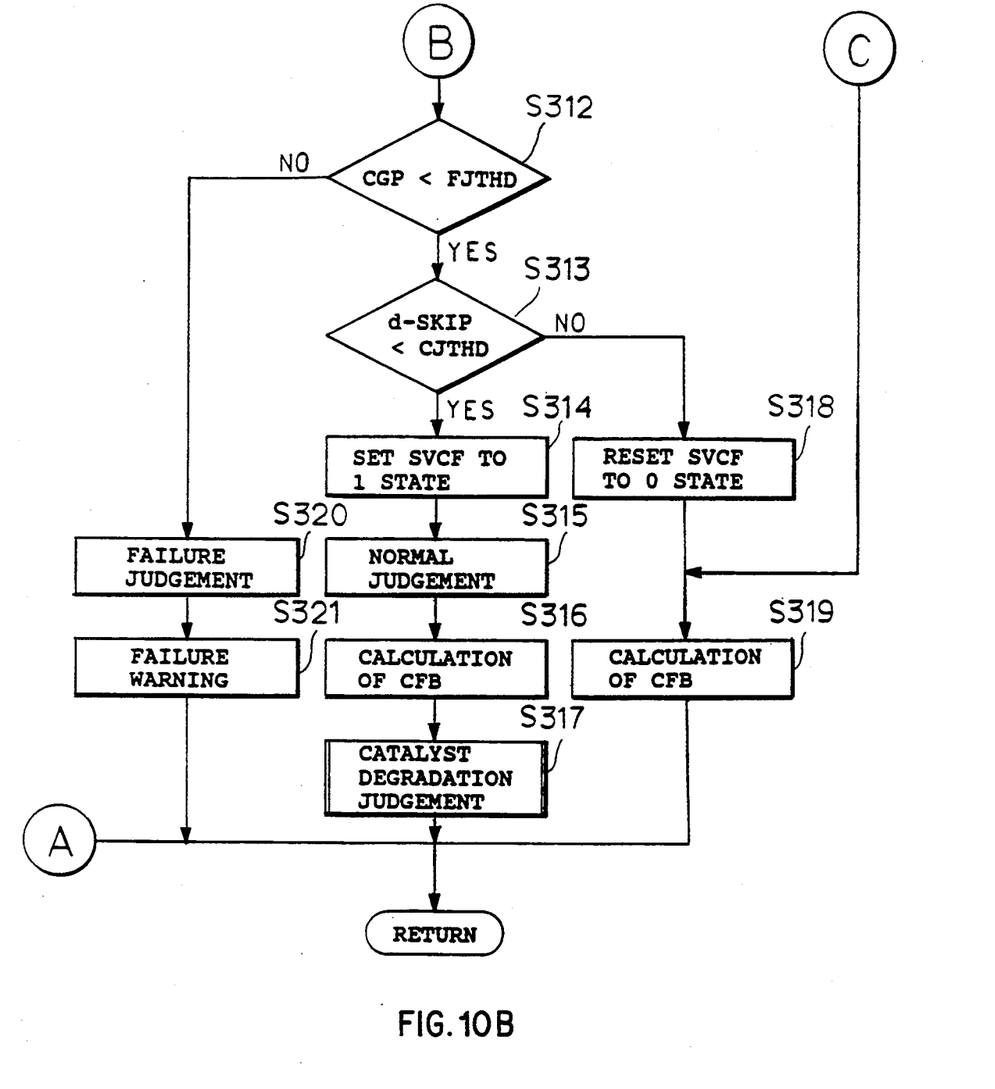

FIG. 10 is a flow chart which illustrates the failure detection sequential routine in which both air-to-fuel ratio feedback control and P-value feedback control are conducted. The routine is characterized in conducting the detection of degradation of the catalytic converter after the detection of lean shift degradation or rich shift degradation of the air-to-fuel ratio sensor and the correction of a skip value used for air-to-fuel ratio feedback control. The first step S301 is to conduct a decision as to whether or not the primary air-to-fuel ratio sensor 12 is active. If in fact the primary air-to-fuel ratio sensor 12 is active, i.e., the answer to the decision made at step S301 is "YES", then the air-to-fuel ratio feedback control is conducted at step S302. Thereafter, a decision is made at step S303 as to whether or not the secondary air-to-fuel ratio sensor 13 is active. If the answer to the decision made at step S303 is "YES", then, after setting, at step S304, a P-value feedback control flag to "1", indicating that the P-value feedback control is allowed, a decision is made at step S305 as to whether or not an output SW from the secondary air-to-fuel ratio sensor 13 is above a preset slice level PSL. If an above-the-slice level output is detected at step S305, after setting a rich fuel flag RFF for the secondary air-to-fuel ratio sensor 13 to "1" at step S306, indicating that an air-to-fuel ratio is on a rich side, the rich side skip value CGPFLR is incremented by a correction value d-SKIP and the lean side skip value CGPFRL is decremented by the correction value d-SKIP at step S307.

If the answer to the decision made at step S305 is "NO," this indicates that the output SW from the secondary air-to-fuel ratio sensor 13 is below the preset slice level PSL. Then, a lean fuel flag LFF for the secondary air-to-fuel ratio sensor 13 is set to "1" at step S308, indicating that an air-to-fuel ratio is on a lean side. Thereafter, at step S309, the rich side skip value CGPFLR is decremented by the correction value d-SKIP, and the lean side skip value CGPFRL is incremented by the correction value d-SKIP.

When the rich side and lean side skip values CGPFLR and CGPFRL are incremented or decremented at step S307 or S309, a decision is made at step S312 as to whether or not a mean value CGP of the rich side and lean side skip values CGPFLR and CGPFRL is beyond a failure judging threshold value FJTHD. If the answer to the decision made at step S312 is "YES," the mean value CGP is below the threshold value TCGP. Another decision is then made at step S313 as to whether or not a threshold value difference DA is beyond a conversion judging threshold value CJTHD for judging a conversion of the P-value feedback control. Here, the threshold value difference DA is defined by a difference DB(i)–DB(i−1) between a current difference DB(i) of a current mean value CGP(i) from a current failure judging threshold value FJCGP(i) and a previous difference DB(i−1) of a previous mean value CGP(i−1) from a previous current failure judging threshold value FJCGP(i−1).

If the answer to the decision made at step S313 is "YES," this indicates that the threshold value difference DA has become below the conversion judging threshold value CJCGP. Then, after setting a skip value conversion flag SVCF to "1" at step S314, the system is judged to be functionally normal at step S315. After carrying out a calculation of a feedback control value CFB by which a fuel injection value is controlled at step S316, the detection of degradation of the catalytic converter is carried out at step S317.

However, if the answer to the decision made at step S313 is "NO", this indicates that the threshold value difference DA is still above the conversion judging threshold value CJTHD. Then, a skip value conversion flag SVCF is reset to "0" at step S318. After carrying out a calculation of a feedback control value CFB at step S319, the sequence orders return.

On the other hand, if the answer to the decision concerning the mean value CGP of the rich side and lean side skip values CGPFLR and CGPFRL relative to the failure judging threshold value FJTHD made at step S312 is "NO", i.e., the mean value CGP of the rich side and lean side skip values CGPFLR and CGPFRL has become greater than the failure judging threshold value FJTHD, then, after judging the system to have functionally failed at step S320, a warning lamp is turned on to provide a failure warning at step S321.

If the answer to the decision concerning the activity of the secondary air-to-fuel ratio sensor 13 made at step S303 is "NO," i.e., the secondary air-to-fuel ratio sensor 13 is inactive, then, after resetting, at step S310, the P-value feedback control flag PFF to "0" state, the rich side skip value CGPFLR and the lean side skip value CGPFRL are set to previous rich and lean side skip values CGPFLR(i−1) and CGPFRL(i−1), respectively, at step S311. After carrying out a calculation of a feedback control value CFB at step S319, the sequence orders return.

If the answer to the decision concerning the activity of the primary air-to-fuel ratio sensor 12 made at step S301 is "NO," i.e., the primary air-to-fuel ratio sensor 12 is inactive, then a feedback control value CFB is fixed as it is.

As was previously mentioned, it has been known that when the secondary air-to-fuel ratio sensor 13 is positioned downstream of the catalytic converter 7, it is hard to raise to the active temperature of the sensor at the beginning of operation. Moreover, heating the secondary air-to-fuel ratio sensor 13 for early activation accelerates its thermal degradation while an engine operates at high speeds and under high loads. This results in changes in detection characteristics of the secondary air-to-fuel ratio sensor 13, and erroneous failure detection can be induced. However, since the heater 13a is activated only while the failure detection sequence is conducted, the secondary air-to-fuel ratio sensor 13 is quickly heated up to its active temperature and, accordingly, suffers less thermal degradation.

Figure 11:
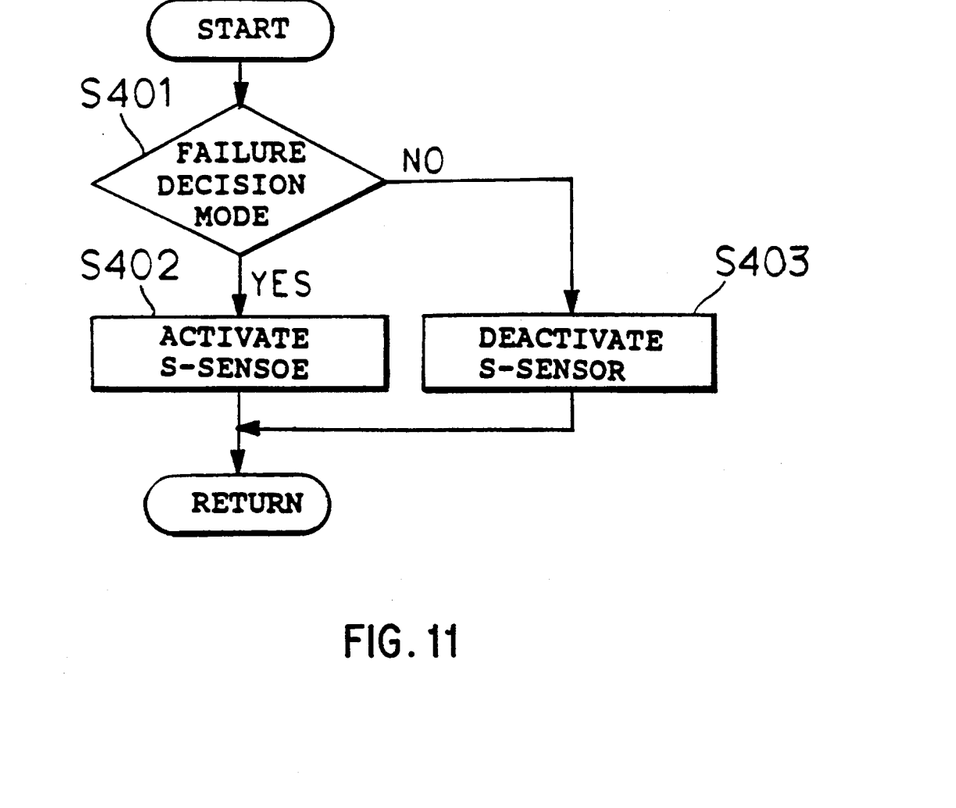
FIG. 11 a flow chart illustrating a heater activation control sequential routine.

FIG. 11 is a flow chart illustrating the heater activation control sequential routine. The first step S401 of this routine is to make a decision as to whether or not the engine operates in a failure detection mode, i.e., in on-idling conditions (see FIG. 2). Only when the engine operates in an on-idling condition is the heater 13a activated to heat the secondary air-to-fuel ratio sensor 13 at step S402. Otherwise, the heater 13a remains inactive at step S403.

It is to be understood that although the present invention has been described in detail with respect to a preferred embodiment thereof, various other embodiments and variants may occur to those skilled in the art by following the teachings herein. Such other embodiments and variants falling within the scope and spirit of the invention and are intended to be covered by the following claims.

What is claimed is:

1. A failure detection system comprising:
   a first air-to-fuel ratio sensor, positioned upstream of a catalytic converter for exhaust gas purification in an engine exhaust line, for monitoring an emission content of exhaust gas discharged from an engine as a first air-to-fuel ratio of an air-fuel mixture based on which an air-to-fuel ratio control system performs a feedback control of an air-to-fuel ratio of the air-fuel mixture so as to maintain a desired ratio of air-to-fuel in the air-fuel mixture,
   a second air-to-fuel ratio sensor, positioned downstream of the catalytic converter in the engine exhaust line, for monitoring a second emission content of exhaust gas passed through the catalytic converter as a second air-to-fuel ratio of the air-fuel mixture, and
   failure detecting means for detecting a level of functional failure of said first air-to-fuel ratio sensor on the basis of said first and second air-to-fuel ratios of the air-fuel mixture with respect to a predetermined threshold value and causing said air-to-fuel ratio control system to correct a feedback control value in said feedback control, the failure detecting means changing a threshold value for detection of a level of functional failure of said first air-to-fuel ratio sensor in accordance with a parameter related to functional degradation of said catalytic converter.

2. A failure detection system as defined in claim 1, wherein said threshold value is decreased as the functional degradation of said catalytic converter advances.

3. A failure detection system comprising:
   a first air-to-fuel ratio sensor, positioned upstream of a catalytic converter for exhaust gas purification in an engine exhaust line, for monitoring an emission content of exhaust gas discharged from an engine as a first air-to-fuel ratio of an air-fuel mixture based on which an air-to-fuel ratio control system performs a feedback control of an air-to-fuel ratio of the air-fuel mixture so as to maintain a desired ratio of air-to-fuel in the air-fuel mixture,
   a second air-to-fuel ratio sensor, positioned downstream of the catalytic converter in the engine exhaust line, for monitoring a second emission content of exhaust gas passed through the catalytic converter as a second air-to-fuel ratio of the air-fuel mixture, and
   failure detecting means for detecting a level of functional failure of said first air-to-fuel ratio sensor on the basis of said first and second air-to-fuel ratios of the air-fuel mixture with respect to a predetermined threshold value and causing said air-to-fuel ratio control system to correct said feedback control, the failure detecting means changing a correction value, after predetermined time intervals during which said air-to-fuel control system performs said feedback control, in accordance with a parameter related to functional degradation of said catalytic converter.

4. A failure detection system as defined in claim 3, wherein, for each predetermined time interval, the correction value is increased as the functional degradation of said catalytic converter advances.

5. A failure detection system comprising:
   a first air-to-fuel ratio sensor, positioned upstream of a catalytic converter for exhaust gas purification in an engine exhaust line, for monitoring an emission content of exhaust gas discharged from an engine as a first air-to-fuel ratio of an air-fuel mixture based on which an air-to-fuel ratio control system performs a feedback control of an air-to-fuel ratio of the air-fuel mixture so as to maintain a desired ratio of air-to-fuel in the air-fuel mixture,
   a second air-to-fuel ratio sensor, positioned downstream of the catalytic converter in the engine exhaust line, for monitoring a second emission content of exhaust gas passed through the catalytic converter as a second air-to-fuel ratio of the air-fuel mixture,
   failure detecting means for detecting functional failure of said first air-to-fuel ratio sensor on the basis of said second air-to-fuel ratio of the air-fuel mixture with respect to a predetermined threshold value, and
   a heater provided in association with said second air-to-fuel ratio sensor, said heater being activated only when a functional failure of said first air-to-fuel ratio sensor is detected.

* * * * *